US009490707B2

(12) United States Patent
Karlsson et al.

(10) Patent No.: US 9,490,707 B2
(45) Date of Patent: Nov. 8, 2016

(54) CONTROL CIRCUIT AND A METHOD FOR AN ENERGY BASED PULSE SKIPPING MODE IN A DC/DC CONVERTER

(71) Applicant: TELEFONAKTIEBOLAGET L M ERICSSON (PUBL), Stockholm (SE)

(72) Inventors: Magnus Karlsson, Oskarshamn (SE); Oscar Persson, Kalmar (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 109 days.

(21) Appl. No.: 14/396,895

(22) PCT Filed: Nov. 26, 2013

(86) PCT No.: PCT/EP2013/074775
§ 371 (c)(1),
(2) Date: Oct. 24, 2014

(87) PCT Pub. No.: WO2015/078489
PCT Pub. Date: Jun. 4, 2015

(65) Prior Publication Data
US 2015/0349646 A1    Dec. 3, 2015

(51) Int. Cl.
*H02M 3/335*    (2006.01)
*H02M 1/00*    (2006.01)
(52) U.S. Cl.
CPC ..... *H02M 3/33507* (2013.01); *H02M 3/33576* (2013.01); *H02M 2001/0035* (2013.01); *Y02B 70/16* (2013.01)
(58) Field of Classification Search
CPC ............... H02M 3/33507; H02M 3/33538; H02M 3/33546; H02M 3/33576; H02M 3/33553; H02M 3/33523; H02M 3/337; H02M 3/33569; H02M 11/00; H02M 2001/0032; H02M 2001/0035; H02M 2001/0038
USPC ...................................... 363/15–26
See application file for complete search history.

(56) References Cited

U.S. PATENT DOCUMENTS

| 4,274,132 A | 6/1981 | Molyneux-Berry |
| 5,973,945 A * | 10/1999 | Balakrishnan .... H02M 3/33576 363/80 |
| 6,396,252 B1 | 5/2002 | Culpepper |

(Continued)

OTHER PUBLICATIONS

Pithadia, Sanjay, et al.; "Understanding TPS61175's Pulse-Skipping Function;" Application Report, SLVA353-Jul. 2009; Texas Instruments; Dallas, Texas.

*Primary Examiner* — Jue Zhang
*Assistant Examiner* — Kyle J Moody

(57) ABSTRACT

A control circuit for a switched mode power supply and a related method are provided for controlling switching elements in a power train of a switched mode power supply. The control circuit comprises a mode controller to monitor the output current to determine whether the output current exceeds a current threshold. The mode controller controls the switching controller to generate the switch control signals. When the current exceeds the current threshold, the power train operates in a continuous conduction mode, and upon determining that the output current has fallen to or below the current threshold, the operation of the power train is changed from the continuous conduction mode to a pulse skipping mode. The pulse skipping mode is entered from the continuous conduction mode and involves determining the amount of energy stored in a secondary circuit of the power train.

16 Claims, 7 Drawing Sheets

(56) References Cited

U.S. PATENT DOCUMENTS

| | | | |
|---|---|---|---|
| 6,418,038 B2* | 7/2002 | Takahama | H02M 3/337 363/132 |
| 7,075,280 B2 | 7/2006 | May | |
| 7,746,926 B2 | 6/2010 | Chu | |
| 7,906,949 B1 | 3/2011 | Sutardja | |
| 2010/0301821 A1* | 12/2010 | Kung | H02M 3/33523 323/283 |
| 2012/0163039 A1 | 6/2012 | Halberstadt | |
| 2012/0235658 A1 | 9/2012 | Liu | |
| 2013/0077350 A1* | 3/2013 | Mao | H02M 3/33523 363/16 |
| 2015/0138844 A1* | 5/2015 | Karlsson | H02M 3/33592 363/21.1 |

* cited by examiner

CONTROL CIRCUIT AND A METHOD FOR AN ENERGY BASED PULSE SKIPPING MODE IN A DC/DC CONVERTER

RELATED APPLICATIONS

This application claims priority to PCT/EP2013/074775, filed Nov. 26, 2013, the disclosure of which is fully incorporated herein by reference.

TECHNICAL FIELD

The present invention relates to a control circuit and a method for a switched mode power supply. More particularly, the present invention relates to a control circuit and a method for a switched mode power supply that is operable to control a pulse skipping mode.

BACKGROUND

The switched mode power supply (SMPS) is a well-known type of power converter that plays a crucial role for supplying modern electronic circuits with power. Several improvements of SMPS have devised ways to increase switching efficiency during high load conditions. An example of such an improvement is the concept of synchronous rectification used in modern SMPS. Synchronous rectification causes the SMPS to achieve high power efficiency at higher current levels. But synchronous rectification suffers from increased switching activity in a power train of the SMPS, which yields decreased efficiency at light load conditions compared to the normal diode rectification conventionally used in traditional SMPS.

Light-load efficiency of SMPS is becoming increasingly important for SMPS powered devices. Improved light-load efficiency helps save energy and extends the battery life of the SMPS powered devices.

Several methods exist in the art for improving light-load efficiency of the SMPS. An example of such a method is to reduce the circulation energy and associated losses by means of running the SMPS in a discontinuous conduction mode (DCM). Another example of a method is to reduce the switching losses by means of reducing the switching frequency at light-load conditions. The final example is aimed towards multiphase converters and the improvement during light-load conditions for these multiphase converters is achieved by shutting down unnecessary phases.

Another well-known method to increase light-load efficiency is to introduce a pulse skipping mode (PSM) of operation. The pulse skipping mode of operation usually involves starting skipping pulses when the duty cycle is below a defined minimum duty cycle. This involves operating the SMPS in discontinuous conduction mode (DCM), examples of this method can be found in application notes for common SMPS controllers such as the TPS61175 from Texas Instrument.

Yet another variant of the pulse skipping mode can be found in U.S. Pat. No. 7,075,280. This variant uses a constant on-time, which means that the off-time is changed and thereby the switching frequency of the SMPS.

Yet another solution is disclosed in US2006/0268974A1 which involves changing operation mode of the SMPS from CCM to DCM without changing the duty cycle of the switching signal.

A problem associated with embodiments of the prior-art solutions is that the DCM of the SMPS is entered during PSM of operation.

SUMMARY

In view of the problems in known SMPS control methods, the present invention aims to improve the light-load efficiency of the SMPS.

It is another object of the present invention to provide a smooth transition between heavy and light loads.

In accordance with an embodiment of the present invention, is a control circuit configured to control the switching elements in a power train of a switched mode power supply (102) provided. The power train is operatively connected to an input terminal and to an output terminal of said switched mode power supply. The control circuit comprises a switching controller operatively connected to said switching elements of the power train. The switching controller being configured to generate switch control signals for said switching elements, the switching controller is further arranged to receive a duty cycle signal. The duty cycle signal controls the duty cycle of the switch control signals. The control circuit further comprises a voltage regulator configured to receive an output voltage signal indicating the output voltage of said output terminal. The voltage regulator is operable for controlling the output voltage at the output terminal by means of generating said duty cycle signal. The duty cycle signal is received by said switching controller. The control circuit further comprises a mode controller configured to receive the output voltage signal and to receive an input voltage signal indicating the input voltage of said input terminal. The mode controller is further configured to receive an output current signal indicative of the output current flowing from the output terminal to a connectable load. The mode controller is further configured to communicate with said switching controller. The mode controller is further configured to monitor the output current signal to determine whether the output current exceeds a current threshold, and is configured to control the switching controller to generate the switch control signals such that, when the current exceeds the current threshold, the power train operates in a continuous conduction mode, and upon determining that the output current has fallen to or below the current threshold the operation of the power train is changed from the continuous conduction mode to a pulse skipping mode. In such a way, that the pulse skipping mode is entered from the continuous conduction mode. The pulse skipping mode involves determining the amount of energy stored in an secondary circuit of the power train. The secondary circuit being operatively connected to the output terminal, and when the amount of energy stored in the secondary circuit has fallen to or below an energy threshold the mode controller instructs the switching controller to enable energy transfer from the primary circuit to the secondary circuit by means of the switch control signals, when the amount of energy stored in the secondary circuit exceeds said energy threshold the energy transfer from the primary circuit to the secondary circuit is disabled by means of the switch control signals.

In accordance with another embodiment of the invention, is a method for control of a switching controller of a switched mode power supply to generate switch control signals for controlling the switching elements in a power train of a switched mode power supply is provided. The power train comprises an primary circuit operatively connected to the input terminal and an secondary circuit operatively connected to the output terminal. The method comprises monitoring an output current signal indicative of the output current flowing from the output terminal to a connectable load, to determine whether the output current exceeds a current threshold. The method further comprises controlling the switch controller to generate switch control signals so as to operate the switched mode power supply in a continuous conduction mode when the output current is determined to exceed the current threshold. Upon determining that the output current has dropped to or below the current threshold, control the switching controller to generate switch control signals so as to change the operation of the power train from continuous conduction mode to pulse skipping mode directly and to lock the value of the duty cycle signal. The pulse skipping mode comprises monitoring an energy level of the secondary circuit. The pulse skipping mode further comprises upon determining that the energy level of the secondary circuit has fallen to or below the energy threshold, cause the switch controller to enable energy transfer from the primary circuit to the secondary circuit by means of the switch control signals. The pulse skipping mode further comprises, upon determining that the energy of the secondary circuit exceeds the energy threshold, the energy transfer from the primary circuit to the secondary circuit is disabled by means of the switch control signals.

BRIEF DESCRIPTION OF THE DRAWINGS

Embodiments of the invention will now be described, by way of example only, with reference to the accompanying drawings in which.

DETAILED DESCRIPTION

In the following, different aspects will be described in more detail with reference to certain embodiments and to accompanying drawings. For purpose of explanation and not limitation, specific details are set forth, such as particular scenarios and techniques, in order to provide a thorough understanding of the different embodiments. However, other embodiments that depart from these specific details may also exist.

Figure 8:
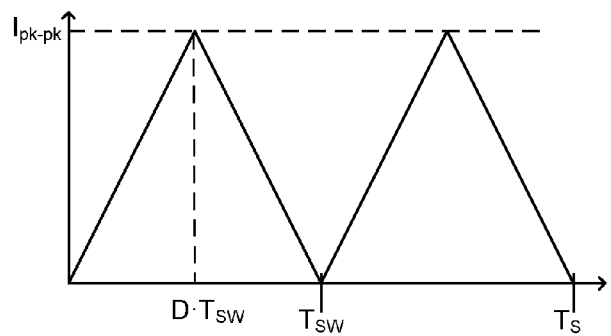
FIG. 8 is a graph of the output current versus time for an embodiment of the present invention.
Figure 9:
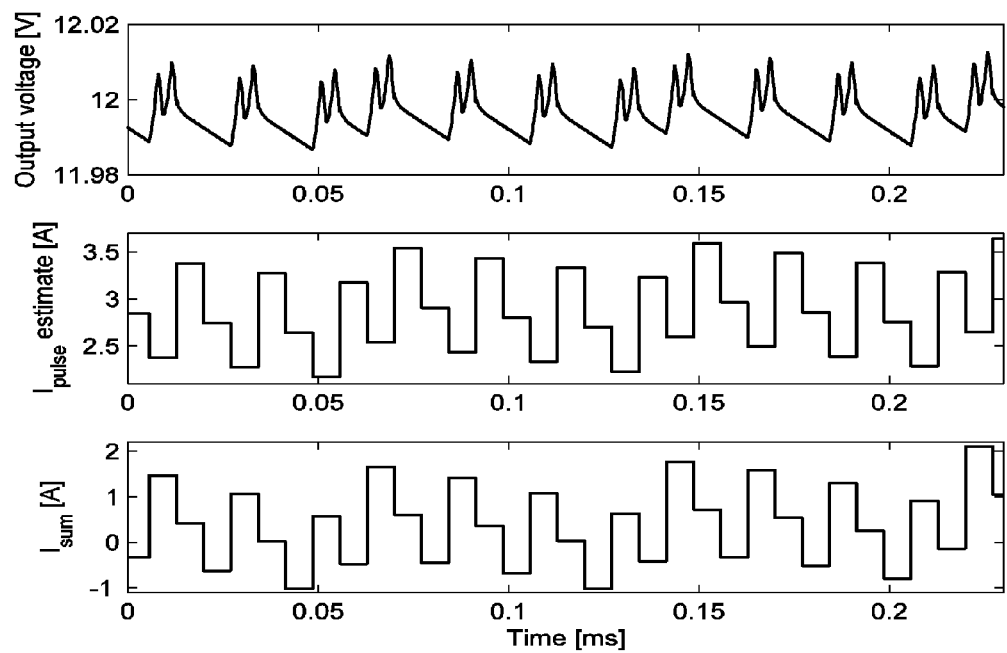
FIG. 9 is a graph of simulation results from a first experiment.

The basic concept of the invention is to utilize a charge/energy calculator that calculates a value of the energy in each pulse. This energy value is stored in an accumulator. The output current that flows to a connectable load is subtracted from the energy value stored in the accumulator. When the energy value stored in the accumulator is below zero a mode controller enables the switching of the power train to charge an output capacitor with a new pulse from an inductor and the corresponding energy value is added to the accumulator. A resulting wave form for one cycle is illustrated in FIG. 9. The duty cycle D in FIG. 8 is preferably a locked duty cycle for continuous conduction mode. The total amount of charge in the two pulses is equal to:

$$Q_{pulse} = I_{mean}T_S = \frac{I_{pk-pk}}{2}T_S =$$
$$\frac{nV_{in} - V_{out}}{2L}DT_{SW}T_S = \frac{nV_{in} - DnV_{in}}{2L}DT_{SW}T_S = \frac{nV_{in}T_{SW}T_S}{2L}(D - D^2)$$

The output current is sampled with the sample period of $T_s$. The total amount of charge is:

$$Q_{tot} = Q_{pulse} - Q_{load} = \frac{nV_{in}T_{SW}T_S}{2L}(D - D^2) - I_{out}T_S$$

Since the switching frequency is constant, the charge calculation can be simplified to calculating the accumulated current samples together with $T_s = 2*T_{sw}$, which gives:

$$I_{sum} = I_{mean} - I_{out} = \frac{nV_{in}T_S}{4L}(D - D^2) - I_{out} = kV_{in}(D - D^2) - I_{out}$$

wherein $$k = \frac{nT_S}{4L}$$

is a constant.

In an alternative embodiment using the falling slope for the calculation, gives a simplified calculation of the mean current $I_{mean}$:

$$I_{mean} = \frac{I_{pk-pk}}{2}2 = \frac{V_{out}}{L}(1 - D)T_{SW}$$

Figure 1:
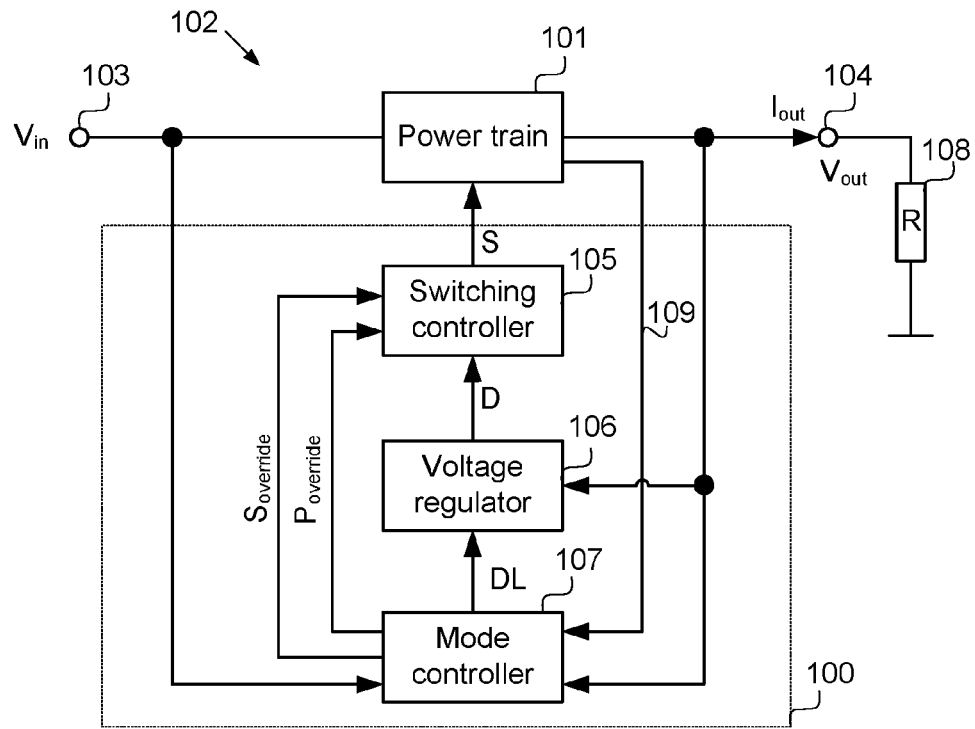
FIG. 1 shows a SMPS according to an embodiment of the present invention.

FIG. 1 shows a switched mode power supply (SMPS) 102 according to an embodiment of the present invention. In this embodiment, the SMPS 102 comprises a power train 101 and a control circuit 100. The power train 101 is operatively connected to an input terminal 103 for receiving an input voltage ($V_{in}$). The power train 101 is further operatively connected to an output terminal 104, the output terminal 104 being configured to be connected to a connectable load 108. The input voltage at the input terminal 103 is converted to a different output voltage at the output terminal 104 by means of said power train 101 being controlled by the control circuit 100.

Figure 2:
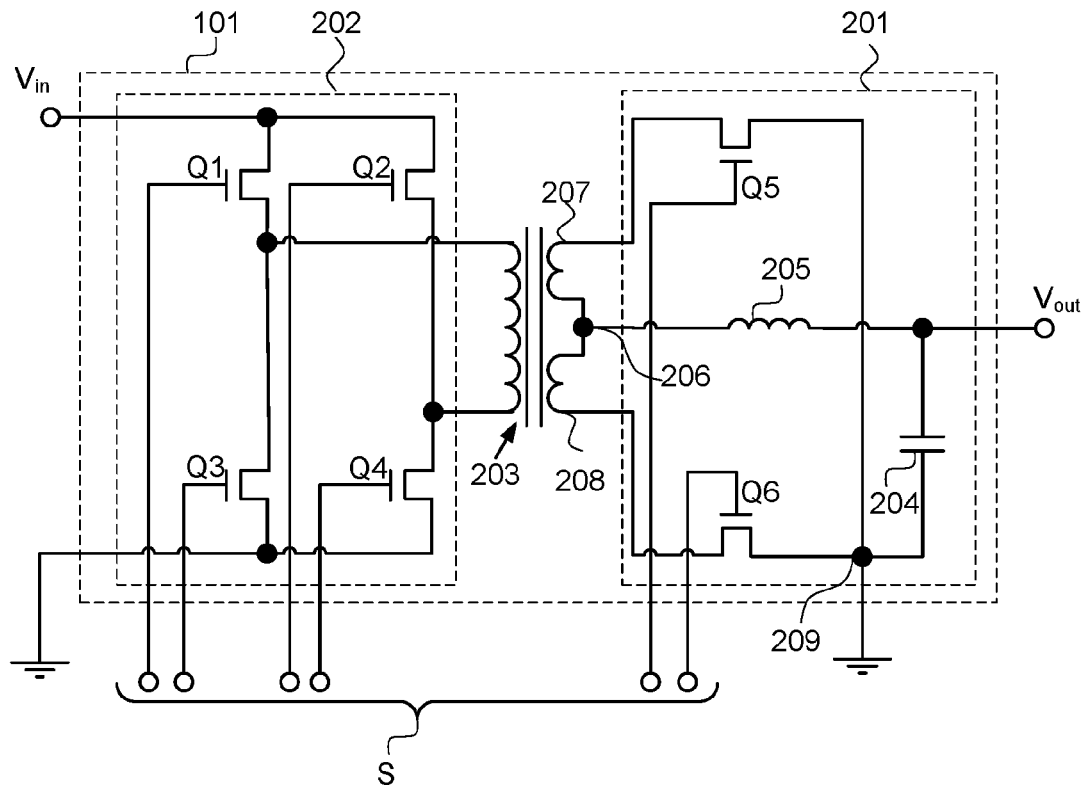
FIG. 2 illustrates a conventional power train of a SMPS that utilizes synchronous rectification and a full bridge.

In order to describe the remaining parts in FIG. 1 reference is now made to FIG. 2.

FIG. 2 shows a conventional power train 101 of a synchronous rectified type. The power train comprises a full-bridge primary circuit 202 being connected to the input terminal 103 and a center tapped transformer 203, a center tapped terminal of the transformer 203 is connected to the output terminal 104 via a secondary circuit 201.

The primary circuit 202 comprises two parallel branches. The first branch comprises a first switching element $Q_1$ and a third switching element $Q_3$ connected in series between the input terminal ($V_{in}$) and a ground node. The second branch comprises a second switching element $Q_2$ and a fourth switching element $Q_4$ connected in series between the input terminal ($V_{in}$) and a ground node. The transformer 203 being connected to the first branch and the second branch in such a way that the first to the fourth switching element $Q_1$-$Q_4$ controls the connection of the input voltage applied to the primary winding of the transformer 203.

The secondary circuit 201 is connected to the center-tapped terminal 206 of the transformer 203, wherein the center-tapped terminal 206 is connected to the output terminal ($V_{out}$) via a series inductor 205. The output terminal ($V_{out}$) is connected to a ground node 209 via a capacitor 204. A first secondary winding 207 of the transformer 203 is connected to the ground node 209 via a fifth switching element $Q_5$. A second secondary winding 208 of the transformer 203 is connected to the ground node 209 via a sixth switching element $Q_6$. The first and second secondary windings of the transformer 203 being connected to the center tap 206.

Each of the first to the sixth switching element $Q_1$-$Q_6$ has a corresponding control lead. This group of control leads is commonly designated switch control signals S and controls said switching elements $Q_1$-$Q_6$ of the power train 101.

Figure 3:
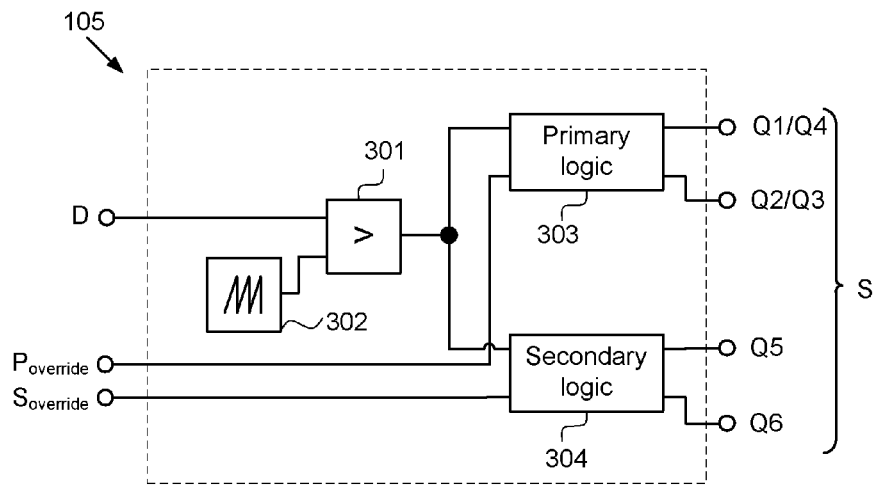
FIG. 3 shows a switching controller according to an embodiment of the present invention.

The control circuit 100 comprises a switching controller 105 operable for generating said switch control signals (S). An embodiment of a switching controller 105 is shown in FIG. 3. The switch control signals S controls the switching elements Q1-Q6 of the power train 101 in order to convert the input voltage at the input terminal 103 to the output voltage at the output terminal 104. The switching controller 105 is configured to receive a duty cycle signal D that is indicative of the commanded duty cycle of the power train 101. The duty cycle signal D is compared with a saw tooth signal from a saw tooth generator 302 in a comparator 301. The output from the comparator 301 is connected to a primary logic circuit 303 and to a secondary logic circuit 304.

The primary logic circuit 303 is configured to generate the necessary switch control signals S for the primary circuit 202 of the power train 101, the primary logic circuit 303 comprises an input for a primary override signal $P_{override}$. This primary override signal inhibits the switch control signals from maneuvering the primary circuit 202 of the power train 101, thereby the switching of the primary circuit 202 is inhibited.

The secondary logic circuit 304 is configured to generate the necessary switch control signals S for the secondary circuit 201 of the power train 101, the secondary logic circuit 303 comprises an input for a secondary override signal $S_{override}$. This secondary override signal $S_{override}$ inhibits the switch control signals S from maneuvering the secondary circuit 201 of the power train 101, thereby the switching of the secondary circuit 201 is inhibited.

Figure 4:
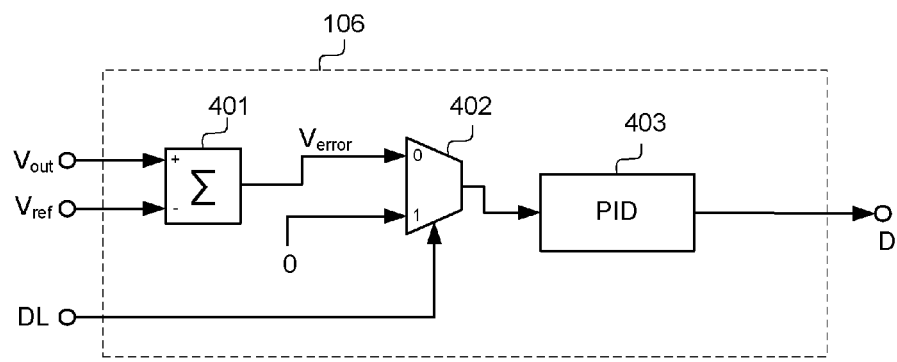
FIG. 4 shows a voltage regulator according to an embodiment of the present invention.

The control circuit 100 further comprises a voltage regulator 106. An embodiment of the voltage regulator 106 is illustrated in FIG. 4. The voltage regulator 106 comprises a difference circuit 401 being configured to calculate the voltage difference between the output voltage $V_{out}$ at the output terminal 104 and a reference voltage $V_{ref}$. The voltage difference $V_{error}$ is used as an input to an multiplexing circuit 402 operable to output said voltage difference $V_{error}$ if a duty cycle lock signal DL is equal to zero. If the duty cycle lock signal DL is equal to one then the multiplexing circuit 402 outputs zero, indicating that the difference between the output voltage and the reference voltage is zero. The output from the multiplexing circuit 302 is used as an input to a PID controller 303 that is operable to generate the duty cycle signal D.

Figure 5:
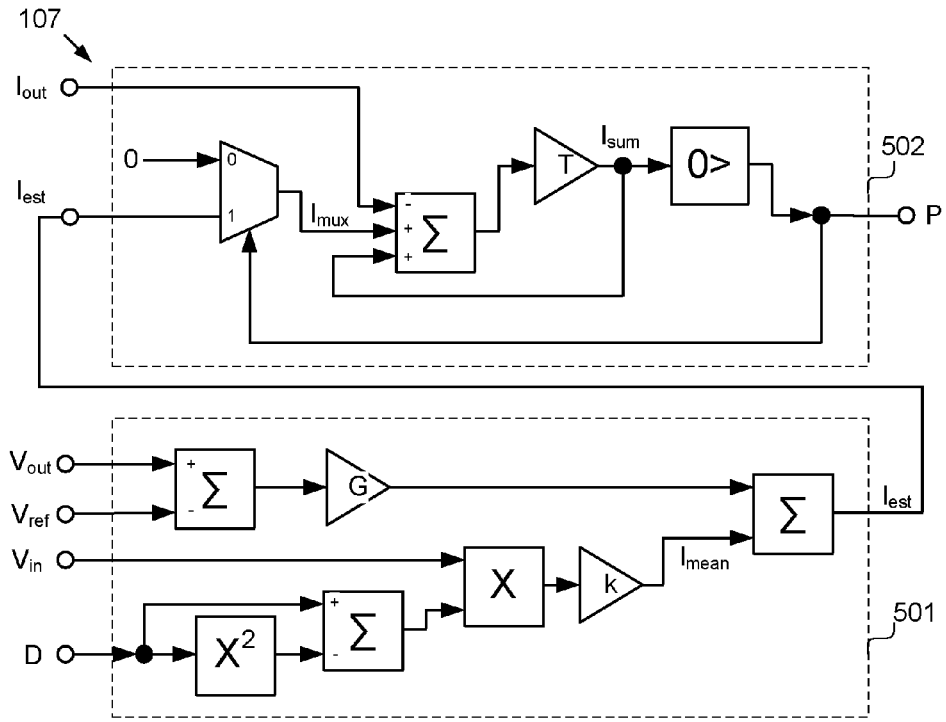
FIG. 5 shows a mode regulator according to an embodiment of the present invention.

The control circuit 100 further comprises a mode controller 107. An embodiment of a mode controller 107 is shown in FIG. 5.

The mode controller 107 comprises a current estimator circuit 501 being configured to estimate the output current $I_{est}$ based on the output voltage $V_{out}$, the reference voltage $V_{ref}$, the input voltage $V_{in}$ and the duty cycle signal D. The estimated current is calculated as:

$$I_{est}=I_{mean}+I_{err}$$

wherein $I_{err}$ is an error current calculated as:

$$I_{err}=G\cdot(V_{out}-V_{ref})$$

where G is a first constant, preferably in an interval [40,80]. The mean current Imean is calculated as:

$$I_{mean}=k\cdot V_{in}\cdot(D-D^2)$$

where k is a second constant.

The estimated output current $I_{est}$ is used as a first input signal to a current accumulator 502. A second input signal to the current accumulator 502 is an output current signal $I_{out}$ 109 indicative of the output current from the power train 101 to a connectable load. The current accumulator 502 is configured to output the pulse skipping signal when a current sum $I_{sum}$ is smaller than zero. The current sum $I_{sum}$ is calculated as:

$$I_{sum}[n]=I_{err}[n]+I_{sum}[n-1]$$

This equation is a difference equation where n is the sample number and n−1 is the previous sample.

If $I_{err}$ [n] is replaced by $I_{mux}[n]-I_{out}[n]$ the following equation is obtained:

$$I_{sum}[n]=I_{err}[n]+I_{sum}[n-1]=I_{mux}[n]-I_{out}[n]+I_{sum}[n-1]$$

$I_{mux}$ is equal to the estimated output current $I_{est}$ when the pulse skipping signal P is generated, otherwise it is equal to zero.

Thereby the available amount of energy in the secondary circuit of the power train during pulse skipping mode is determined, and upon determining that $I_{sum}$ is smaller than zero a pulse signal is generated, causing the switch controller to enable energy transfer from the primary circuit to the secondary circuit of the power train.

In another embodiment of the current estimator is the mean current $I_{mean}$ calculated using the ideal duty cycle in PSM:

$$D_{ideal}=V_{out}/(n\ V_{in})$$

The mean current $I_{mean}$ is calculated as $$I_{mean}=n\cdot V_{in}\cdot T_s/L\cdot(D-D^2)=T_s\cdot V_{out}/L\cdot(1-V_{out}/(n\cdot V_{in}))$$

This expression for the mean current $I_{mean}$ is preferably pre-computed and stored in a look-up table for a given output voltage $V_{out}$ with the input voltage $V_{in}$ used as a key for the look-up table.

Figure 6:
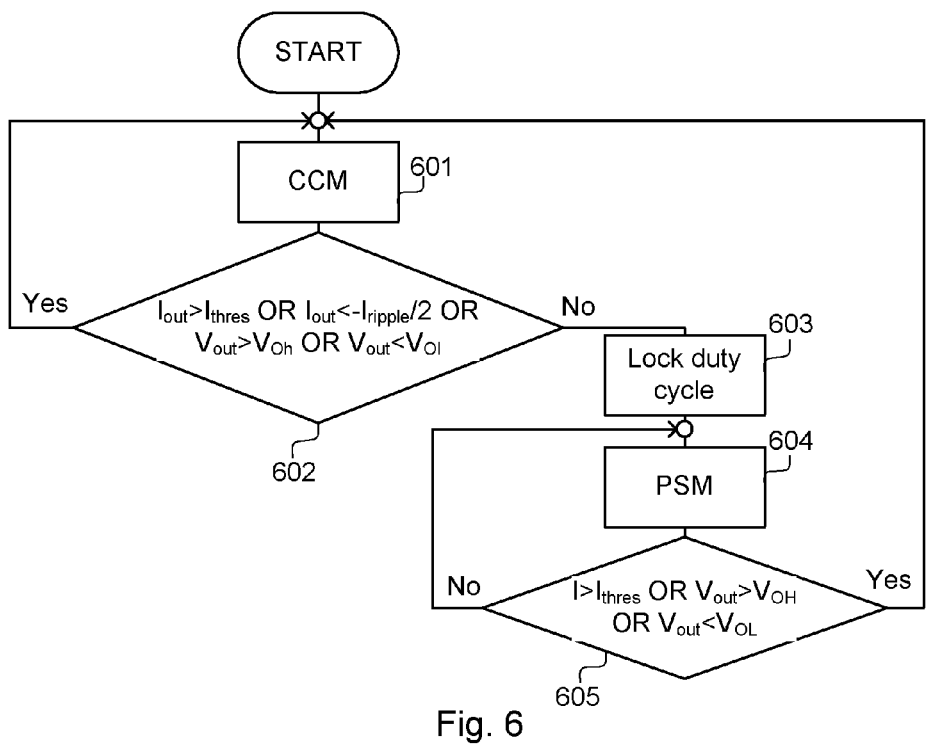
FIG. 6 is a flowchart illustrating a method of controlling the SMPS according to an embodiment of the invention.

FIG. 6 is a flow chart showing the processing operations performed by the control circuit 100 according to a first embodiment to control the operational mode of the power train 101 of the SMPS 102.

In the example of FIG. 6, the power train 101 of the SMPS 102 begins operating under the control of the control circuit 100 in a first step 601. In this step the output voltage ($V_{out}$)

of the SMPS 102 is regulated by the control circuit 100 such that the power train 101 operates in a continuous conduction mode (CCM).

In the second step 602 the mode controller uses the signal indicative of the output current $I_{out}$ to determine whether the output current $I_{out}$ exceeds a threshold value $I_{thres}$.

Furthermore, in order to prevent possible damage to the switching elements $Q_5$ and $Q_6$ that might occur in consequence of an abrupt drop in the load current from the SMPS 102, the mode controller 107 also determines in the second step 602 whether the output current $I_{out}$ is smaller than $-I_{ripple}/2$ at any stage during the switching cycle. The reason for this safeguard is that switching OFF the fifth switching element $Q_5$ and the sixth switching element $Q_6$ while a large reverse current is flowing through the inductor 205 risks damaging or destroying these switching elements. It is therefore undesirable for the fifth and the sixth switching elements to be switched off if a reverse current greater than $-I_{ripple}/2$ flows through the inductor 205.

In the second step 602 the mode controller preferably also determines, as in the present embodiment, whether the output voltage $V_{out}$ is outside a voltage range $V_{Ol} < V_{out} < V_{Oh}$. If this is the case it is preferable for the SMPS 102 to forgo the efficiency improvements gained as a result of operating in the pulse skipping mode described below, and instead regulate the output voltage $V_{out}$ to keep it within the prescribed range.

If the mode controller 107 determines in the second step 602 that the output current $I_{out} > I_{thres}$, and/or that the output current $I_{out} < -I_{ripple}/2$, and/or that the output voltage is outside the aforementioned range $[V_{Ol}, V_{Oh}]$, the mode controller 107 controls the switching controller 105 to maintain the operation of the power train 101 in CCM and the process returns to the first step 601. In this case the mode controller 107 sets the duty cycle lock signal (DL) to zero which causes the zeroing generator 302 to relay the error signal $V_{error}$ to the PID controller 303.

Furthermore, if none of the conditions tested for in the second step 602 are satisfied, the mode controller 107 enters a third step 603. In this third step 603 the mode controller 107 sets the duty cycle lock signal DL to one which causes the zeroing generator 402 to output a zero to the PID controller 303 indicating that there is no difference between the reference voltage and the output voltage, thereby causing the duty cycle value D output by the PID controller 303 to be locked.

After the duty cycle is locked a fourth step 604 is executed. This fourth step 604 involves generating and transmitting the secondary override signal $S_{override}$ and the primary override signal $P_{override}$ from the mode controller 107 to the switching controller 105. The transmitting of the primary and secondary override signals to the switching controller 105 causes the primary logic circuit 303 and the secondary logic circuit to stop the operation thereof. Thereby, no switching occurs and the power train 101 operates in the pulse skipping mode (PSM). In PSM the switch control signals S are not forwarded to the corresponding switch elements $Q_1$-$Q_6$.

In order to prevent energy transfer from the secondary circuit 201 to the primary circuit 202 of the power train 101, the mode controller 107 first causes the fifth switching elements $Q_5$ and the sixth switching element $Q_6$ to turn off, and then in the next switching period cause the first switching element $Q_1$ to the fourth switching element $Q_4$ to turn off.

While the power train 101 is operating in the PSM, the mode controller 107 continues to monitor the output current signal $I_{out}$ and the output voltage signal $V_{out}$. In a fifth step 605 the mode controller 107 determines whether the output current $I_{out}$ is larger than the threshold value $I_{thres}$, and whether the output voltage signal $V_{out}$ is outside a second range of values that encompasses the first range of voltages $[V_{Ol}, V_{Oh}]$ e whether $V_{out} > V_{OH}$ or $V_{out} < V_{OL}$ where $V_{OL} < V_{Ol} < V_{Oh} < V_{OH}$. This comparison of the output voltage prevents undesired oscillations.

If any of the conditions $I_{out} > I_{thres}$, $V_{out} \geq V_{OH}$ and $V_{out} < V_{OL}$ is satisfied in the fifth step 605, the mode controller 107 instructs the switching controller 105 to resume operation in accordance with the duty cycle signal D and simultaneously the override signals are disabled and the duty cycle lock signal (DL) is set to zero, thus allowing the power train 101 to resume operation in CCM in the first step 601. Thus, the power train 101 changes from operating in PSM back to operating in CCM under PWM control. Since the value of the duty cycle D was locked by the mode controller 107 in the third step 603, the switching mode controller 105 resumes operations in the CCM using the locked value of the duty cycle D.

In another embodiment is an additional condition added to the fifth step 605. This additional condition is $I_{sum} < I_{min}$ and if $I_{sum}$ is smaller than a minimum value $I_{min}$ the mode controller 107 should resume operation in CCM. This additional condition may reduce the output voltage variations when the load increases slowly and becomes close to the CCM limit.

In yet another embodiment may the minimum value $I_{min}$ be dependent on the estimated current signal $I_{est}$, $I_{sum} \leq -w \cdot I_{est}$ where w is a suitable positive constant w<1 in a preferred embodiment is w=1.5.

In yet another embodiment is it determined if the next pulse is enough to charge the capacitor. This is achieved by including the output current $I_{sum} + I_{est} < I_{out}$ which causes a smooth transition.

Figure 7:
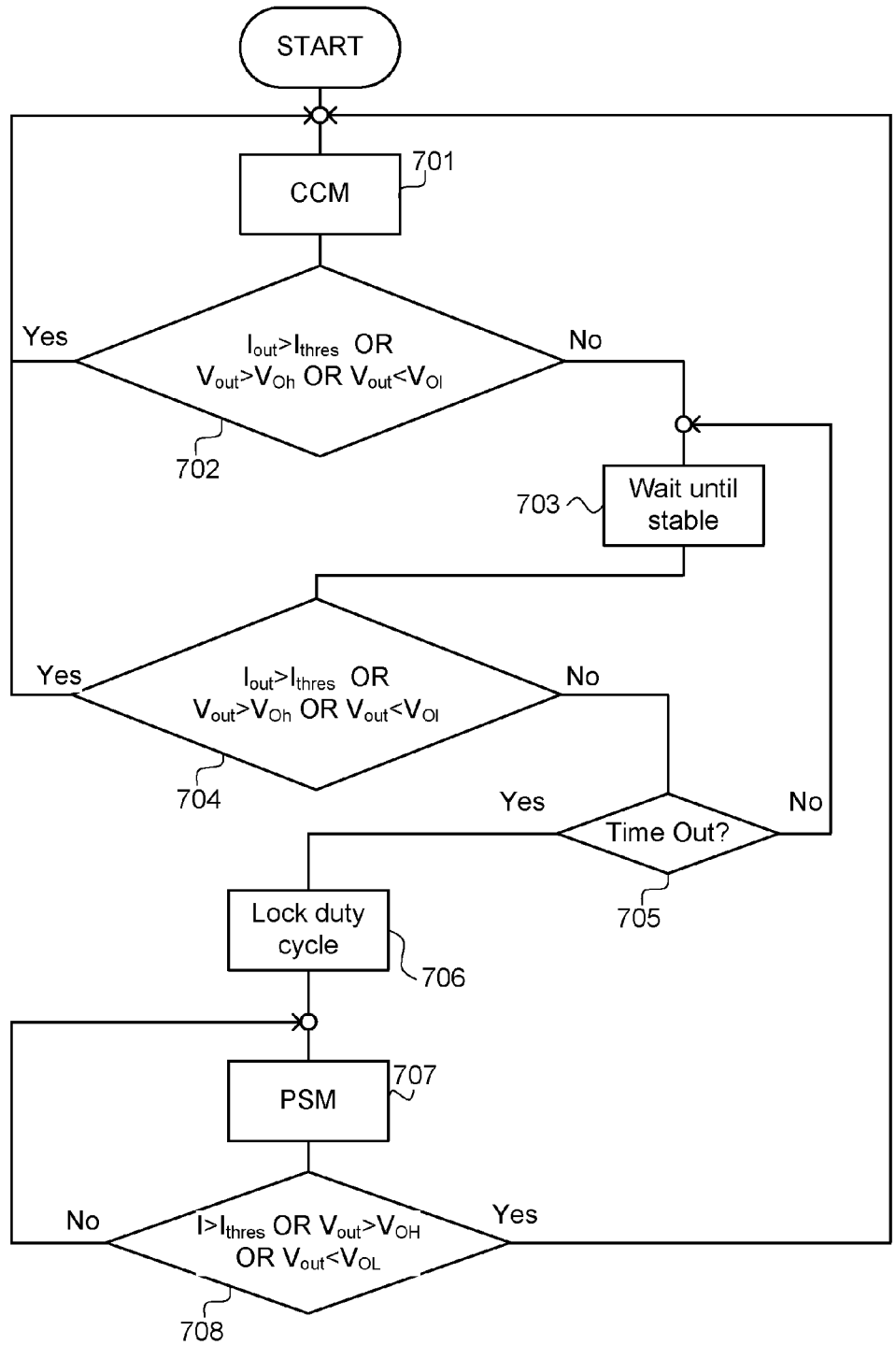
FIG. 7 is a flowchart illustrating a method of controlling the SMPS according to an embodiment of the present invention.

FIG. 7 is a flow chart showing the processing operations performed by the control circuit 100 according to a second embodiment for controlling the operational mode of the power train 101 of the SMPS 102.

In the example of FIG. 7, the power train 101 of the SMPS 102 begins operating under the control of the control circuit 100 in a first step 701. In this step the output voltage of the SMPS 102 is regulated by the control circuit 100 such that the power train 101 operates in a continuous conduction mode (CCM).

In a second step 702 the mode controller uses the received signal indicative of the output current $I_{out}$ to determine whether the output current $I_{out}$ exceeds a threshold value $I_{thres}$.

In the second step 702 the mode controller preferably also determines, as in the present embodiment, whether the output voltage $V_{out}$ is outside a voltage range $V_{Ol} < V_{out} < V_{Oh}$. If this is the case it is preferable for the SMPS 102 to regulate the output voltage $V_{out}$ to keep it within the prescribed range.

If the mode controller 107 determines in the second step 702 that the output current $I_{out} > I_{thres}$ and/or that the output voltage is outside the aforementioned range $[V_{Ol}, V_{Oh}]$, the mode controller 107 controls the switching controller 105 to maintain the operation of the power train 101 in CCM and the process returns to the first step 701. In this case the mode controller 107 issues an instructing signal to the zeroing generator which causes the zeroing generator 302 to relay the error signal $V_{error}$ to the PID controller 303.

Furthermore, if none of the conditions tested for in the second step 702 are satisfied, the mode controller 107 executes a third step 703. In this third step 703 the mode controller waits a defined time, which should be of a length necessary for the transient to disappear and for the output current to become stable.

In a fourth step 704 the mode controller 107 uses the received signal indicative of the output current $I_{out}$ to determine whether the output current $I_{out}$ exceeds a threshold value $I_{thres}$.

In the fourth step 704 the mode controller 107 preferably also determines whether the output voltage $V_{out}$ is outside a voltage range $V_{Ol} < V_{out} < V_{Oh}$. If this is the case it is preferable for the SMPS 102 to regulate the output voltage $V_{out}$ to keep it within the prescribed range.

Furthermore, if none of the conditions tested for in the fourth step 704 are satisfied, the mode controller 107 executes a fifth step 705.

In the fifth step 705, the mode controller determines if the output current $I_{out} < I_{thres}$ after a defined time being long enough for the transients to disappear and the current from the inductor to become stable.

If it is determined in the fifth step 705 that the output current $I_{out}$ is larger than the threshold $I_{thres}$ after the defined time the mode controller executes the first step 701.

If it is determined in the fifth step 705 that the transient has disappeared and the output current $I_{out} < I_{thres}$ after the defined time, a sixth step 706 is entered.

In this sixth step 706 the mode controller 107 generates the duty cycle lock signal DL that causes the zeroing generator 302 to output a zero to the PID controller 303 indicating that there is no difference between the reference voltage and the output voltage, thereby causing the duty cycle value D output by the PID controller 303 to be locked.

After the duty cycle is locked a seventh step 707 is executed. This seventh step 707 involves generating and transmitting the secondary override signal $S_{override}$ and the primary override signal $P_{override}$ from the mode controller 107 to the switching controller 105. The transmitting of the primary and secondary override signals to the switching controller 105 causes the primary logic circuit 303 and the secondary logic circuit to stop the operation thereof. Thereby, no switching occurs and the power train 101 operates in the pulse skipping mode (PSM). In PSM the switch control signals S are not forwarded to the corresponding switch elements $Q_1$-$Q_6$.

In order to prevent energy transfer from the secondary circuit 201 to the primary circuit 202 of the power train 101, the mode controller 107 first causes the fifth switching elements $Q_5$ and the sixth switching element $Q_6$ to turn off, and then in the next switching period cause the first switching element $Q_1$ to the fourth switching element $Q_4$ to turn off.

While the power train 101 is operating in the PSM, the mode controller 107 continues to monitor the output current signal $I_{out}$ and the output voltage signal $V_{out}$. In an eighth step 708 the mode controller 107 determines whether the output current $I_{out}$ is larger than the threshold value $I_{thres}$, and whether the output voltage signal $V_{out}$ is outside a second range of values that encompasses the first range of voltages $[V_{Ol}, V_{Oh}]$, i.e. whether $V_{out} > V_{OH}$ or $V_{out} < V_{OL}$, where $V_{OL} < V_{Ol} < V_{Oh} < V_{OH}$. This comparison of the output voltage prevents undesired oscillations.

If any of the conditions $I_{out} > I_{thres}$, $V_{out} > V_{OH}$ and $V_{out} < V_{OL}$ is satisfied in the eighth step 708, the mode controller 107 instructs the switching controller 105 to resume operation in accordance with the duty cycle signal D and simultaneously the override signals and the duty cycle lock signal are disabled, thus allowing the power train 101 to resume operation in CCM in the first step 701. Thus, the power train 101 changes from operating in PSM back to operating in CCM under PWM control. Since the value of the duty cycle D was locked by the mode controller 107 in the sixth step 706, the switching mode controller 105 resumes operations in the CCM using the locked value of the duty cycle D.

This second embodiment does not require the possibility to measure negative currents.

In order to further elucidate the beneficial features of the invention a series of experiments were conducted.

The SMPS 102 used in these experiments included a power train 101 with a primary side 202 full-bridge arrangement and center-tapped secondary side synchronous rectification circuit 201, as has been described above with reference to FIG. 2. The input voltage $V_{in}$ was set at 54 V and the nominal output voltage, $V_{nom}$, was 12 V. The PID regulator design was adjusted for the CCM mode using standard rules of thumb, by placing one zero at the resonance frequency of the output LC filter 15 and the other zero one octave below, and adjusting the gain for appropriate gain and phase margins.

The voltage thresholds (in Volts) used in these experiments was as follows: $V_{OL}$=11.97; $V_{Ol}$=11.98; $V_{nom}$=12.00; $V_{Oh}$=12.02; $V_{OH}$=12.03.

In general, these limits should, of course, be adjusted for the technology used, e.g. limited by an analog-to-digital converter (ADC) when using a digital implementation.

Now with reference made to FIG. 9 a first experiment will be described. The first experiment uses a constant output current of 1.0 A. The current in each inductor pulse is ideally 3.5 A. This means that approximately only 1/3.5 of the pulses are required. In FIG. 9, it is shown that the a little more than ⅓ of the pulses is required. The mean value of the estimated current $I_{est}$ is just below 3. Hence, the ideal $I_{mean}$ of 3.5 is a little too high. The voltage feedback compensates for that error and the resulting output voltage is equal to the reference voltage 12 V. The output voltage ripple is 20 $mV_{pk-pk}$.

Figure 10:
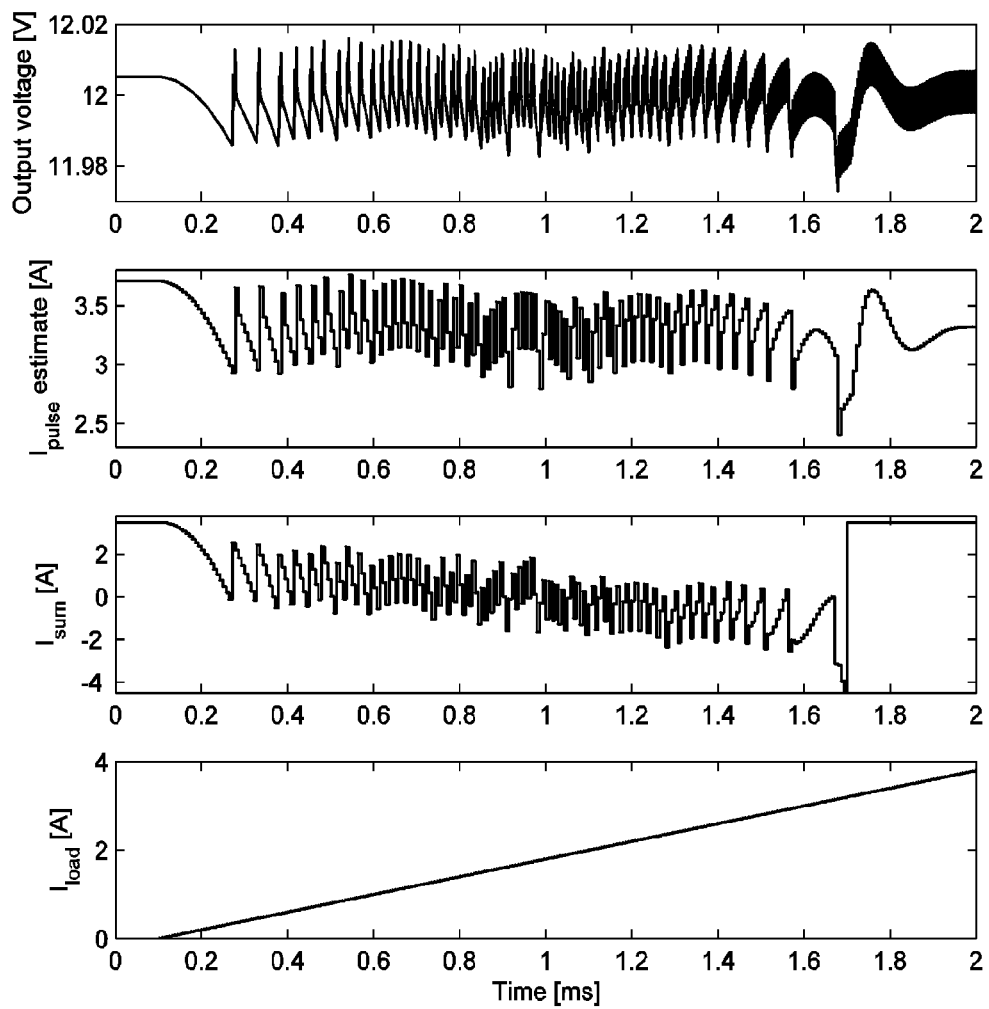
FIG. 10 is a graph of simulation results from a second experiment.

A second experiment was conducted in order to investigate the behavior during a slow output current increase from 0 to 6 A where the system will change from PSM mode to PWM mode. This experiment is illustrated in FIG. 10. Initially, the output current is zero and the switching elements $Q_1$-$Q_6$ are in an off state. The current sum $I_{sum}$ is pre-loaded with the ideal mean current value $I_{mean}$. The load increases causing the $I_{sum}$ to go below zero and a first charging pulse is initiated. With increasing output current the charging pulses are more frequently initiated. When the output current reach a certain limit i.e. when the $I_{sum}$ goes below the $-I_{est}$ 1.5 threshold the system changes to PMW mode regulation. Avoiding a large voltage deviation, i.e., the $V_{OL}$ threshold is never reached.

Figure 11:
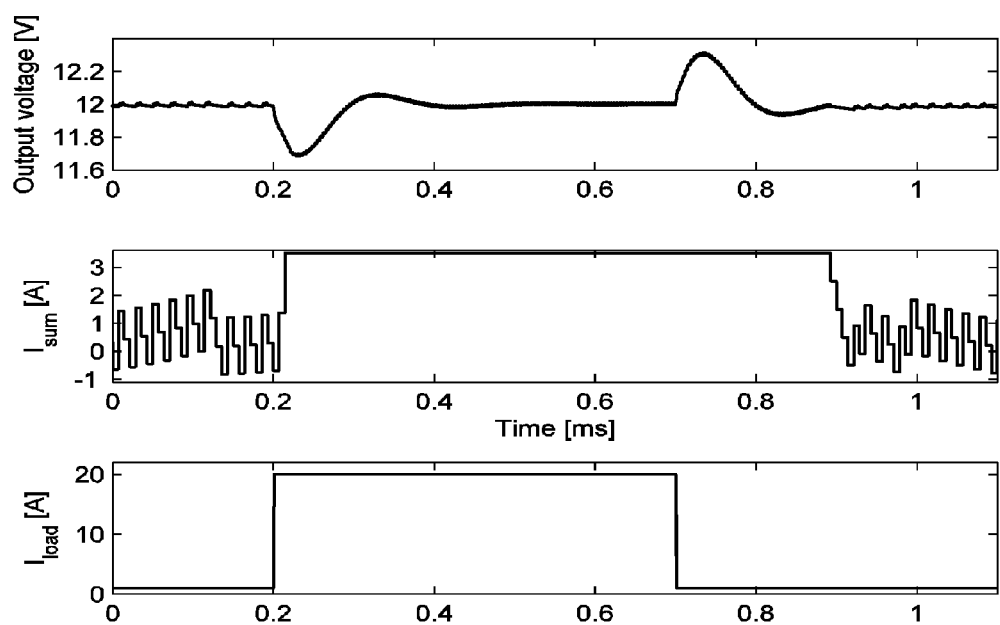
FIG. 11 is a graph of simulation results from a third experiment.

A third experiment was conducted in order to investigate the behavior during load transients. This behavior is tested with a square wave shaped load step of 1-20-1 A. The output voltage during these load steps are shown in FIG. 11. The standard PWM with always CCM mode shows voltage deviations of −±0.31 V, simulations not shown. The PWM with pulse skipping shows identical voltage deviations in FIG. 11. Hence, transitions between the PSM and the PWM regulators cause a minimum of disturbances.

The invention claimed is:

1. A control circuit configured to control switching elements in a power train of a switched mode power supply, wherein the power train is operatively connected to an input terminal and to an output terminal of the switched mode power supply, wherein the control circuit comprises:

a switching controller operatively connected to the switching elements of the power train, and configured to generate switch control signals for the switching elements, the switching controller further arranged to receive a duty cycle signal, wherein the duty cycle signal controls the duty cycle of the switch control signals;

a voltage regulator configured to receive an output voltage signal indicating an output voltage ($V_{out}$) of the output terminal, and being operable for controlling the output voltage at the output terminal by means of generating the duty cycle signal that is received by the switching controller; and a mode controller configured to receive the output voltage signal ($V_{out}$) and to receive an input voltage signal ($V_{in}$) indicating the input voltage of the input terminal, the mode controller further configured to receive an output current signal indicative of an output current ($I_{out}$) flowing from the output terminal to a connectable load, the mode controller further arranged to communicate with the switching controller;

wherein the mode controller is configured to monitor the output current signal to determine whether the output current ($I_{out}$) exceeds a current threshold, and is configured to control the switching controller to generate the switch control signals such that, when the output current exceeds the current threshold, the power train operates in a continuous conduction mode, and when the output current ($I_{out}$) falls to or below the current threshold, the operation of the power train is changed from the continuous conduction mode to a pulse skipping mode such that the pulse skipping mode is entered from the continuous conduction mode, wherein the pulse skipping mode involves determining an amount of energy stored in an secondary circuit of the power train, the secondary circuit being operatively connected to the output terminal, and when the amount of energy stored in the secondary circuit has fallen to or below an energy threshold, the mode controller instructs the switching controller to enable energy transfer from the primary circuit to the secondary circuit by means of the switch control signals, and when the amount of energy stored in the secondary circuit exceeds the energy threshold, the energy transfer from the primary circuit to the secondary circuit (201) is disabled by means of the switch control signals.

2. The control circuit according to claim 1, wherein the mode controller comprises:

a current estimator configured to estimate the output current $I_{est}=I_{error}+I_{mean}$ wherein:

$I_{error}=G \cdot (V_{out}-V_{ref})$ where G is a first constant and $V_{ref}$ is a reference voltage; and $I_{mean}=k \cdot V_{in} \cdot (D-D^2)$ where k is a second constant;

a current accumulator configured to generate a pulse signal when a current sum ($I_{sum}$) is smaller than zero, wherein:

$I_{sum}[n]=I_{mux}[n]-1_{out}[n]+I_{sum}[n-1]$, where n denotes a sample number and n−1 denotes a previous sample number, $I_{mux}$ is equal to $I_{est}$ when a pulse signal is generated, otherwise $I_{mux}$ is zero, whereby an available amount of energy in the secondary circuit of the power train during pulse skipping mode is determined, and when $I_{sum}$ is smaller than zero a pulse signal is generated, causing the switching controller to enable energy transfer from the primary circuit to the secondary circuit of the power train.

3. The control circuit according to claim 1, wherein the mode controller is configured to:

monitor the output current signal to determine whether the output current has dropped to or below the current threshold and to determine whether the output current is smaller than $-I_{ripple}/2$, where $I_{ripple}$ is a magnitude of a ripple current component of the output current;

monitor the output voltage signal to determine whether the output voltage is within a first predetermined range; and when the output current has dropped to or below the current threshold and when the output voltage is within the first predetermined range, control the switching controller to maintain operation of the switched mode power supply in the continuous conduction mode.

4. The control circuit according to claim 1, wherein the mode controller is operable to:

monitor the output current signal to determine whether the output current has dropped to or below the current threshold for at least a predetermined time;

monitor the output voltage signal to determine whether the output voltage is within a first predetermined range;

when the output current signal has dropped to or below the current threshold for at least the predetermined time and when the output voltage is within the first predetermined range, control the switching controller such that the operation of the switched mode power supply is changed from continuous conduction mode to the pulse skipping mode.

5. The control circuit according to claim 1, wherein the mode controller is configured to, after causing the switched mode power supply to enter the pulse skipping mode and when the output current has risen above the current threshold or when the output voltage has moved outside a second predetermined range of values that encompasses the first predetermined range of values, cause the switching controller to generate switch control signals such that the operation of the switched mode power supply changes from pulse skipping mode to continuous conduction mode.

6. The control circuit according to claim 1, wherein:

the control circuit is operable to control the power train in the switched mode power supply, the power train comprises a primary circuit having a first group of switching elements and a secondary circuit having a second group of switching elements, the primary circuit and the secondary circuit being operatively connected to each other by a transformer; and the mode controller is configured, during the change of operation from continuous conduction mode to pulse skipping mode, to first turn off the first group of switching elements in a first switching period, and then turn off the second group of switching elements in the next switching period, whereby the transfer of energy from the secondary circuit to the primary circuit is prevented.

7. The control circuit according to claim 1, wherein the mode controller is configured to generate a lock signal, and the lock signal configured to lock the duty cycle signal from the voltage regulator, when causing operation of the power train to change from the continuous conduction mode to the pulse skipping mode.

8. The control circuit according to claim 7, wherein the mode controller is operable to cause the switching controller to resume operation using the locked value of the duty cycle signal when the power train resumes operation in the continuous conduction mode after having operated in the pulse skipping mode.

9. The control circuit according to claim 7, wherein the voltage regulator comprises:
an error signal generator configured to receive the output voltage signal ($V_{out}$) and operable to generate a voltage error signal ($V_{error}$) based on a difference between the output voltage signal and a reference voltage signal ($V_{ref}$);
a PID or PI regulator operable to generate the duty cycle signal in dependence on the voltage error signal; and
a zeroing generator operable for relaying the voltage error signal to the PID or PI regulator and for setting the voltage error signal to zero upon receiving the duty cycle lock signal.

10. The control circuit according to claim 1, wherein the current threshold is equal to $I_{ripple}/2$, where $I_{ripple}$ is a magnitude of a ripple current component of the output current.

11. A method for control of a switching controller of a switched mode power supply to generate switch control signals for controlling switching elements in a power train of the switched mode power supply so as to convert an input voltage at an input terminal to an output voltage at an output terminal, wherein the power train comprises a primary circuit operatively connected to the input terminal and a secondary circuit operatively connected to the output terminal, the method comprising:
monitoring an output current signal indicative of an output current flowing from the output terminal to a connectable load to determine whether the output current exceeds a current threshold;
controlling the switch controller to generate switch control signals so as to operate the switched mode power supply in a continuous conduction mode when the output current is determined to exceed the current threshold; and
when the output current has dropped to or below the current threshold,
controlling the switching controller to generate switch control signals so as to change the operation of the power train from continuous conduction mode to pulse skipping mode directly and to lock a value of the duty cycle signal (D), wherein the pulse skipping mode comprises:
monitoring an energy level of the secondary circuit;
when the energy level of the secondary circuit has fallen to or below the energy threshold, enabling an energy transfer from the primary circuit to the secondary circuit by means of the switch control signals; and
when the energy level of the secondary circuit exceeds the energy threshold, disabling the energy transfer from the primary circuit to the secondary circuit by means of the switch control signals.

12. The method according to claim 11, wherein the step of monitoring the energy level of the secondary circuit comprises:
estimating an output current $I_{est}=I_{error}+I_{mean}$ wherein:
$I_{error}=G \cdot (V_{out}-V_{ref})$ where G is a first constant and $V_{ref}$ is a reference voltage; and
$I_{mean}=k \cdot V_{in} \cdot (D-D^2)$ where k is a second constant;
generating a pulse signal (P) when a current sum ($I_{sum}$) is smaller than zero, wherein:
$I_{sum}[n]=I_{mux}[n]-I_{out}[n]+I_{sum}[n-1]$, where n denotes a sample number and n−1 denotes a previous sample number, $I_{mux}$ is equal to $I_{est}$ when a pulse signal is generated, otherwise $I_{mux}$ is zero, whereby an available amount of energy in the secondary circuit of the power train during pulse skipping mode is determined, and when $I_{sum}$ is smaller than zero a pulse signal is generated, enabling energy transfer from the primary circuit to the secondary circuit of the power train.

13. The method according to claim 11, further comprising:
monitoring the output current signal to determine whether the output current has dropped to or below the current threshold and to determine whether the output current is smaller than $-I_{ripple}/2$, where $I_{ripple}$ is the magnitude of a ripple current component of the output current;
monitoring the output voltage signal to determine whether the output voltage is within a first predetermined range; and
when the output current has dropped to or below the current threshold and when the output voltage is within the first predetermined range, generate switch control signals to maintain operation of the switched mode power supply in the continuous conduction mode.

14. The method according to claim 11, comprising:
monitoring the output current signal to determine whether the current has dropped to or below the current threshold for at least a predetermined time;
monitoring the output voltage current signal to determine whether the output voltage is within a first predetermined range; and
when the output current signal has dropped to or below the current threshold for at least a predetermined time and when the output voltage is within the first predetermined range, generate switch control signals such that the operation of the switched mode power supply is changed from continuous conduction mode to the pulse skipping mode.

15. The method according to claim 11, comprising:
after causing the switched mode power supply to enter the pulse skipping mode and when the output current has risen above the current threshold or when the output voltage has moved outside a second predetermined range of values that encompasses the first predetermined range of values, generate switch control signals such that the operation of the switched mode power supply changes from pulse skipping mode to continuous conduction mode.

16. The method according to claim 11, wherein the threshold current is equal to $I_{ripple}/2$, where $I_{ripple}$ is the magnitude of the ripple current component of the output current.

* * * * *